Aug. 12, 1924.
W. M. GENTLE
BUMPER FOR VEHICLES
Filed Dec. 18, 1923
1,504,548
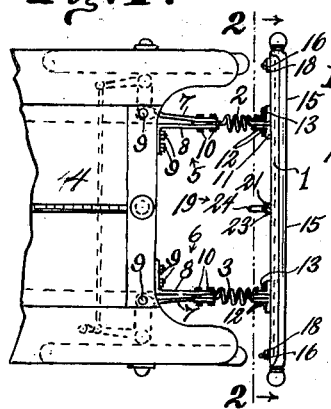
Inventor.
William M. Gentle
by
William M. Gentle
his Attorney.
Witness:
Thomas J. Gentle Patented Aug. 12, 1924.

1,504,548

UNITED STATES PATENT OFFICE.

WILLIAM M. GENTLE, OF LOS ANGELES, CALIFORNIA, ASSIGNOR OF ONE-HALF TO ROBERT BRUCE GENTLE, OF NEW YORK, N. Y.

BUMPER FOR VEHICLES.

Application filed December 18, 1923. Serial No. 681,362.

*To all whom it may concern:*

Be it known that I, WILLIAM M. GENTLE, a citizen of the United States, residing at Los Angeles, in the county of Los Angeles and State of California, have invented a new and useful Bumper for Vehicles, of which the following is a specification.

This invention relates to appliance to be attached in the front and rear of vehicles so that in the event of a collision with anything, the damage to both the vehicle and object will be minimized; and an object of this invention is to minimize the damages of collisions.

An object of the invention is to provide a bumper that is especially adapted to minimize injury to a person that is struck by a vehicle. To that end I provide a bumper having a bar provided with a pneumatic tube that is arranged to first contact with and adapted to readily yield when in collision with a person; and the tube is soft and pliable so that in a collision it spreads over a large area of the person and is thereby less liable to cause a deep bruise, lacerate the flesh and break bones, than the rigid wooden or metal bars now commonly in use; and co-acting with the tube are the coiled springs that support the bar and which function also to minimize the injury to persons struck by a car.

Also the bumper is arranged so that the end of the bar in a collision can yield independently of the other end and thereby cause the bar to stand aslant to the car so as to throw a person off to the side instead of in front of a car.

An object of the invention is to provide a bumper bar having a support in which are arranged two coiled springs each having its end portions flattened and bent into central alignment with the longitudinal axis of the spring; and the end portions are provided with bolt holes so that the spring can be easily and quickly installed by relatively unskilled labor; so that time and expense can be saved in the assembly and installation of the bumper.

An object of the invention is to provide a bumper bar that can yield readily in any direction or have universal movement.

An object of the invention is to provide a bumper that is neat and pleasing in appearance; easy to construct, assemble and attach to a vehicle, and which is durable in use and effective in operation.

A feature of the invention is shown in the construction, combination and arrangement of the bumper, whereby a double resiliency is obtained.

Another feature of the invention is shown in the construction of the pneumatic tube, and the means for stretching and securing it along the front face of the bumper bar.

Other objects, advantages and features of invention may appear from the accompanying drawing, the subjoined detailed description and the appended claims.

The accompanying drawing illustrates the invention.

Figure 1 is a plan view of a bumper constructed in accordance with this invention; and shown mounted on the front of an automobile of the Ford type, a fragmental portion of which is shown.

Fig. 2 is an enlarged section on the line 2—2, Fig. 1.

Fig. 3 is a rear view of the steel bumper bar detached from its associated parts; and is shown arranged in the same position it occupies in Fig. 2.

Fig. 4 is a rear view of the pneumatic tube detached from the bumper bar; and is shown in the same position it occupies in Fig. 2.

Fig. 5 is an enlarged plan view of the bumper as assembled and ready to be attached to an automobile; and showing the steel bumper bar and pneumatic tube in section.

Fig. 6 is a detached enlarged side view of one of the coiled springs that support the bumper bar; showing the construction and arrangement of the flattened end portions that are aligned and central to a longitudinal axis of the spring.

Fig. 7 is a plan view of the coiled spring shown in Fig. 6.

Fig. 8 is an enlarged cross section on line 8—8, Fig. 10.

Fig. 9 is an enlarged cross section on line 9—9, Fig. 2.

Fig. 10 is an enlarged cross section on line 10—10, Fig. 5.

Fig. 11 is a fragmental sectional view of the coiled spring bumper attached to a conventional automobile frame.

The bumper comprises a bar 1 that is supported by the coiled springs 2, 3 that are connected to a vehicle body 4 by a pair of twin brackets 5, 6. The springs 2, 3 are constructed alike so they are interchangeable, each having flattened end portions aligned and provided with bolt holes as shown.

The twin brackets are preferably formed of spring steel plates 7, 8 that are arranged to brace one another as well as to have a slight sidewise resiliency.

The rear ends of the plates 7, 8 are bent so that they can be fitted and secured by bolts 9 to either the front or rear of a vehicle, preferably the front of a vehicle as shown in Fig. 1.

The front ends of the plates 7, 8 are spaced apart to receive the flattened rear ends of the springs 2, 3; and these ends are secured together by the bolts 10 so as to hold the springs extended in front of the vehicle, and to prevent pivotal movement of the secured ends.

The front ends of the springs 2, 3 are flattened, fitted and secured against pivotal movement between the angle plates 11 by the bolts 12; and the angle plates are secured to the bar 1 by bolts 13.

The front ends of the springs 2, 3 are squared so that they fit flush against the rear face of the bar 1 to thereby form a neat appearing connection between the springs and bar.

The bolts 13 are countersunk from the front of the bar rearwardly so that the flat heads of the bolts lie flush with the surface of the channel 14 in the front face of the bar 1.

A pneumatic tube 15 is adapted to be fitted into the channel 14 and secured to the bar 1 by the end bolts 16 that have their heads vulcanized into the tube 15 adjacent its ends; and these bolts are arranged to extend through the slots 17 in the ends of the bar 1 and be secured thereto by the nuts 18.

An air valve 19 has an end 20 secured, preferably by vulcanizing, to the tube 15 at a point about mid-way between the ends of the tube; and this valve is provided with a threaded stem 21 that normally extends in the same plane as the bolts 16 when secured to the bar 1.

The stem 21 is adapted to be fitted through an opening 22 in the bar 1; and it is secured to the bar by a nut 23, and the stem is provided with the usual dust cap 24.

The valve 19 can be of any standard make, and is therefore not shown in detail in the drawings or described in the specification; except that in addition to its use to inflate the tube it also functions as a means for securing the center portion of the tube to the bar.

The tube 15 is attached to the bar 1 by first inserting the stem 21 through the opening 22 and then securing it to the bar by the nut 23, so that the center portion of the tube lies in the channel 14.

Then tension is applied to the ends of the tube to stretch it straight along the channel 14 and arrange it with the bolts 16 extended through the slots 17 in which position they are secured as previously stated by the nuts 18.

After the tube is thus stretched and secured to the bar it is inflated with air through the valve 19 which adds additional tension to stretch the tube and hold it evenly extended along the front face of the bar 1.

With the parts constructed and arranged as described and attached to a vehicle the bumper can function to minimize the damages and to reduce the shock of a collision.

It is also constructed and arranged to permit a universal movement of the bumper bar so that it can yield readily and quickly in any direction to alleviate the shock and mitigate the damages of a collision.

In addition to mounting the bar so that it can readily move to minimize the shock and damages of a collision the bar is faced with a pneumatic tube the purpose of which is to additionally minimize or reduce injury in the event that the collision is with an animate object such as a person as previously stated.

I claim.

1. The bumper for vehicles set forth comprising a bar; a coiled spring having flattened ends that are aligned and arranged central to the longitudinal axis of said spring; and bolts extending through bolt holes in said spring ends for securing said spring to said bar and a vehicle, said bolts adapted to prevent pivotal movement of the spring ends.

2. The bumper for vehicles set forth comprising a bar in combination with a pair of interchangeable coiled springs; said springs having flattened ends that are aligned with the longitudinal axis of the respective springs, said flattened end portions having bolt holes therethrough; and means in connection with the bolt holes through said flattened ends to hold them from pivotal movement and to secure said springs to said bar and a vehicle.

3. The bumper for vehicles set forth comprising a bar having a front face and a channel therein and said bar having slotted ends; a pneumatic tube adapted to extend along the face of said bar and be fitted into the channel of said bar; bolts adjacent the ends of said tube, said bolts adapted to extend through the slots in said bar and be secured thereto; a valve attached to said tube said valve having a stem; and means for securing said stem to said bar.

In testimony whereof, I have hereunto set my hand at Los Angeles, California, this 13th day of December, 1923.

WILLIAM M. GENTLE.

Witness:
ARTHUR F. LARRABEE.